Dec. 20, 1932.　　　　D. C. SCOTT　　　　1,891,652
BRAKE TESTING APPARATUS
Filed Jan. 9, 1931　　　2 Sheets-Sheet 2
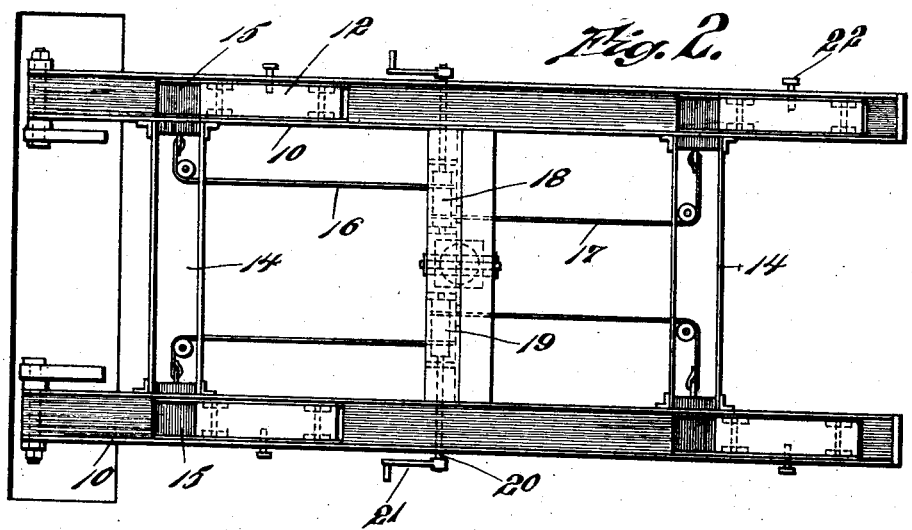
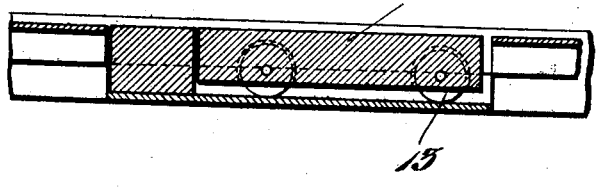
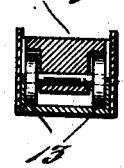
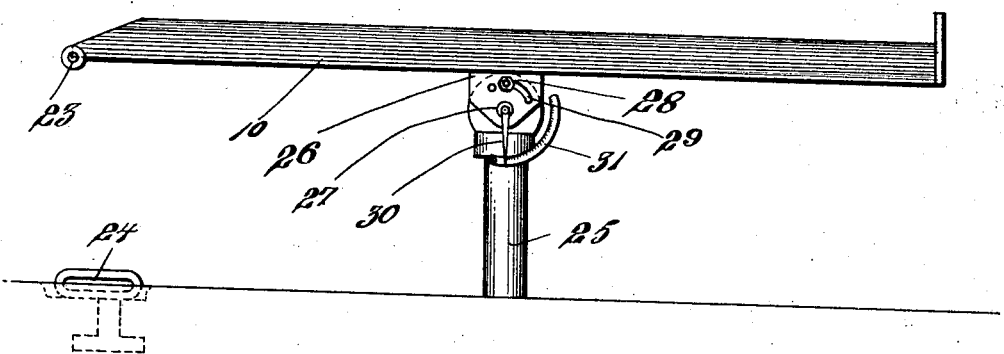
INVENTOR.
David C. Scott
BY Barlow & Barlow
ATTORNEYS.

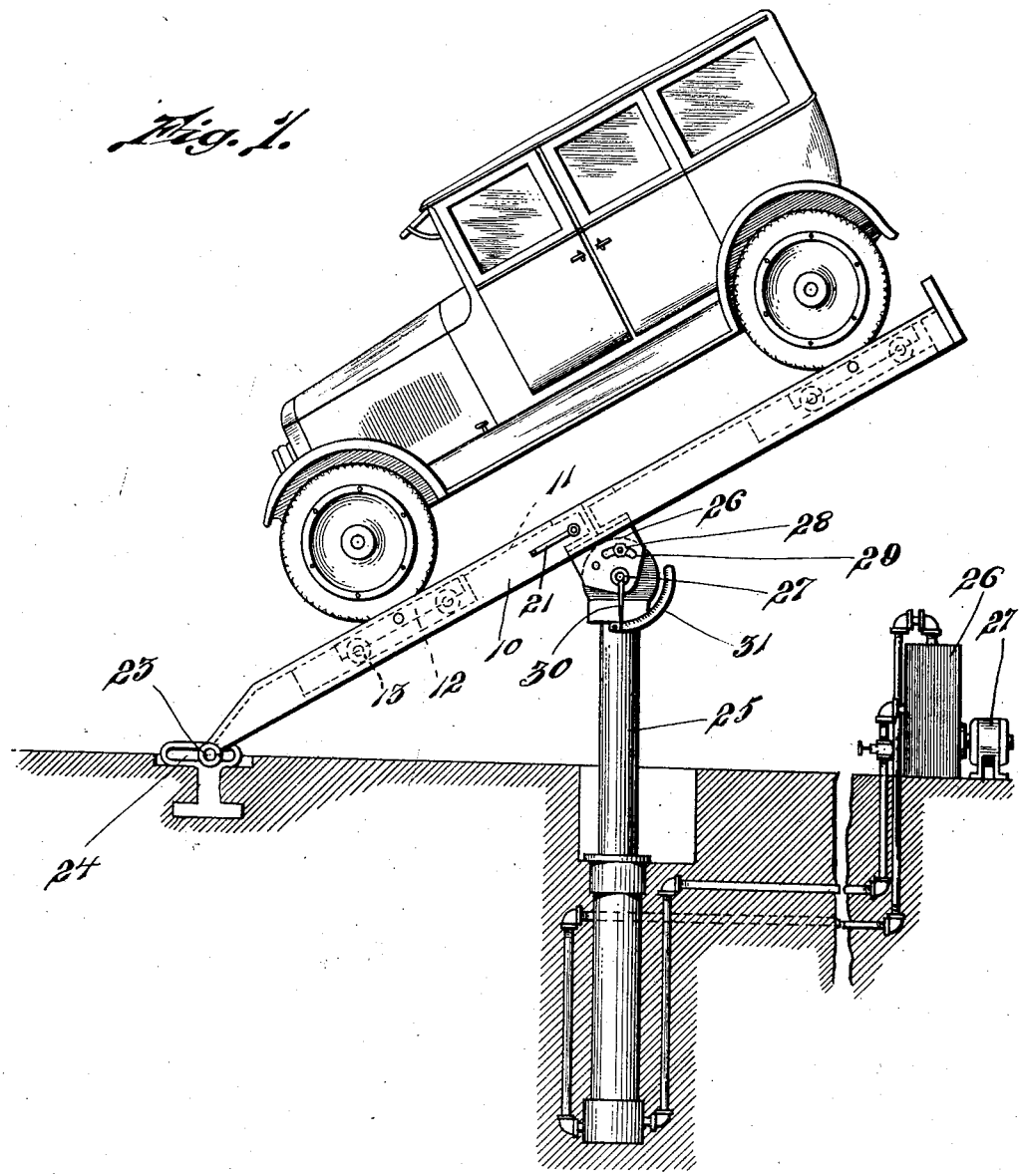

Patented Dec. 20, 1932

1,891,652

UNITED STATES PATENT OFFICE

DAVID C. SCOTT, OF PROVIDENCE, RHODE ISLAND, ASSIGNOR TO HENRY L. SCOTT COMPANY, A CORPORATION OF RHODE ISLAND

BRAKE TESTING APPARATUS

Application filed January 9, 1931. Serial No. 507,590.

This invention relates to a brake testing apparatus and has for its object to provide a device which may be used not only as a brake tester but also may be used as a greasing stand for automobiles.

A further object of the invention is the provision of apparatus which may more accurately test the decelerating effect by the application of the brakes to an automobile.

A still further object of the invention is the method and means of taking into consideration in determining the decelerating power of a brake; the frictional sliding resistance of the tires of an automobile which contact with the road surface, rather than merely the power of the brakes themselves.

With these and other objects in view, the invention consists of certain novel features of construction, as will be more fully described, and particularly pointed out in the appended claims.

In the accompanying drawings:

Fig. 1 is a side elevation partly diagrammatic illustrating the brake-testing apparatus with an automobile mounted thereon.

Fig. 2 is a top plan view of the apparatus.

Fig. 3 is a sectional detail of one of the carriages.

Fig. 4 is a section taken thru the carriage.

Fig. 5 is a section thru the supporting runway.

Fig. 6 is an elevation with the apparatus disconnected from the inclined arrangement for use as a greasing plant.

With the increasing use of automobiles, it is exceedingly important that the brakes of the different vehicles be such as to bring the vehicle to a stop quickly. It is known, however, that the brakes of an automobile are not alone responsible for the decelerating effect thereon but that the weight of the automobile, the surface of the tires and surface of the road over which the automobile is traveling play a large and important part in the stopping thereof, and it is the purpose of the present invention to employ a method and apparatus which will take into effect the surface of the tires and road surface in the accomplishing of the desired result. And in order that such a structure may be provided I have provided a plane surface upon which the vehicle to be tested is mounted with portions of the surface upon which the vehicle rests surfaced as would be the ordinary road over which the vehicle is operating and means to tilt the support until at a certain inclination the car either rolls because of the failure of the brakes to overcome the force of gravity tending to move the vehicle along the support or else slides along the support because of the failure of frictional resistance between the tires and the support; and in order that one or any number of the four wheels may be tested for decelerating effect individually, I have provided means to remove the frictional resistance upon the other three or any number of wheels to permit one of the wheels to be tested by inclination of the device; and the following is a detailed description of the present embodiment of this invention illustrating the preferred means by which these advantageous results may be accomplished:—

With reference to the drawings, 10 designates a support or runway providing a plane surface 11 with carriages 12 mounted on rollers or wheels 13 set into the runway with its upper surface in the plane of the general surface of the runway 11. The runways 10 are suitably secured together by cross beams 14, and removable blocks 15 are provided to be inserted thru the runways to lock the cars or carriages 12 against movement. These blocks 15 may be simultaneously withdrawn from the carriages by suitable cords 16 and 17 mounted to be wound about the drums 18 and 19 in opposite directions which may revolve upon an axle 20 and crank 21. The carriages may also be locked in place by means of bolts 22 extending thru the runway and into the sides thereof. The runway is pivotally connected at 23 in a slot 24 and may be raised in any suitable way, such as by a piston 25 operated hydraulically, from the control apparatus 26 and electric motor and pump 27, which will raise one end of the runway to incline it, as illustrated in Fig. 1. The connection between the piston 25 and the runway 10 is by means of suitable bracket 26 pivoted at 27 and operated to permit the bolt 28 to swing in the slot 29.

An indicating arm 30 may be moved over the scale 31 to show the amount of inclination in degrees or any other unit of measure from which the effective force tending to move the vehicle may be calculated by taking into consideration the weight of the vehicle, the force being the mass multiplied by the sine of the angle of inclination.

This apparatus may also be used as a greasing stand by disconnecting the pivotal connection 23 and setting up on the bolt 28, or by otherwise suitably securing and locking the runway against tipping movement relative to the piston 25, after which the automobile may be raised for suitably greasing in the customary fashion.

The runways of the aforementioned apparatus may be surfaced with any desired road surface mounted upon the carriages 12 and a runway thus surfaced may be provided in such shape that they may be interchanged so that concrete, asphalt or tarred surface may be used as desired to determine different conditions under actual road use.

The vehicle to be tested will be mounted upon the runway and the same inclined to a predetermined definite angle which may be calculated by the supervisory road-governing authorities, so that a force calculated to apply the minimum amount of strain under which a vehicle will hold, both against sliding and rolling, and should the car maintain itself at such an angle the car might be said to pass a satisfactory test; or if it is desired that an individual wheel be tested to hold the car at a certain specific predetermined amount of applied force consistent with the inertia of the car, the car will be mounted upon the runway and one of the carriages will be secured against movement, whereas the other three carriages will be left free to roll, whereupon all of the force of the car caused by inclination will be brought to bear upon a single wheel, the other wheels being moved from their frictional resistance due to the permissive movement of the wheels 13, and should the car hold thus against this predetermined tendency towards movement, this wheel of the car may be said to pass a satisfactory examination. Each wheel in turn may be tried in the same manner.

Should, however, it be desirable to test the actual stopping force or decelerating effect of the car as a whole upon any given desired surface, this surface will be duplicated upon the runway of the car mounted thereon, the brakes will be set and inclination will be effected until movement of the car commences along the runway and the angle at which movement commences will then be observed and the power applied may be calculated by multiplying the sine of this angle by the weight of the car, which will give the effective power for producing a movement of the car along this surface when the brakes are set against movement.

In a similar manner, the effective stopping force of each of the wheels may be calculated by mounting the car upon the support, freeing three of the carriages, to permit their movement while locking the other carriage against movement and then inclining the support until the car just moves by means of its single wheel holding, the angle at this point to be observed and calculations to be determined as above outlined. This may be repeated for all of the wheels to determine the amount of holding power of each wheel and then should there be an undesirable variation, adjustment may be made upon the brakes until the wheels are equal.

From the above, it will be observed that I have provided a plane surface upon which a car is tested, which is the type of surface over which the car travels and follows closely the actual traveling conditions of the vehicle. It is, of course, understood that the inertia of the car may require a greater inclination than should the car be moving, but this effect may be compensated for by calculation and an increase in the angle of inclination for determination of the desired final result.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. The method of testing brake effectiveness of a motor vehicle having a plurality of wheels comprising steps of positioning a plurality of wheels of the vehicle on a plane surface, then while the vehicle is at rest braking said wheels against tendency to rotative movement, and then varying the pitch of the plane surface to a point necessary to move said braked wheels and plane surface relative to each other.

2. A method of determining the decelerating effect of movement of a vehicle when braked, comprising bringing the vehicle onto a support, the inclination of which may be changed, applying the brakes and measuring the angular inclination of the support for the vehicle to produce initial movement under action of gravity.

3. A method of determining the decelerating effect of movement of a vehicle when braked, comprising bringing the vehicle onto a support, the inclination of which may be changed, applying the brakes and tilting the vehicle on a support to produce movement, and measuring the least angularity of the support to produce movement.

4. A method of measuring sliding resistance of a rotary element supporting a vehicle, which consists in bringing the vehicle on to a support, the inclination of which may be changed, locking the element against rotary movement on a support, inclining the support to produce movement of the vehicle and sliding of the element on to the support, and measuring the least angular inclination to produce such movement.

5. A method of measuring the decelerating effect of a single wheel of a vehicle having a plurality of wheels, which consists in bringing the vehicle onto a support, the inclination of which may be changed, so that all the wheels engage the support, removing the frictional resistance to movement of all wheels but said single wheel, applying the brakes on the vehicle, inclining the vehicle support to produce movement of the vehicle, and measuring the least angular inclination to produce such movement.

6. A method of testing the stopping effect of an automobile, which consists in mounting an automobile on an inclinable runway, applying the brakes and tilting the runway until movement of the automobile along the runway occurs, and calculating the force applied from the weight of the automobile and the angle of inclination.

7. A method of testing the stopping power of one wheel of an automobile of known weight on a given surface, which consists in mounting the automobile with each wheel on a separate carriage which is supported on an inclinable runway, each carriage being surfaced with the desired surface, applying the brakes leaving all of the carriages except the wheel to be tested free to be moved along the runway and inclining the runway until movement of the automobile occurs, measuring the angle of inclination of the automobile and calculating the stopping power of the wheel to be tested therefrom.

8. In a testing apparatus, a runway for the support of an automobile, or the like, consisting of spaced tracks to receive the wheels of the automobile, a slidable vertical support, means for pivoting said tracks on said support, and means providing a horizontally slidable pivot for one end of said tracks, said means being disconnectable at will.

9. In a testing apparatus, a runway, carriages on said runway, movable means for supporting said carriages on said runway, means for securing any one or more of said carriages against movement relative to said runway, and means to incline said runway at an angle to the horizontal.

10. In a testing apparatus, a runway for the support of an automobile or the like, means secured to the center of said runway to lift the runway, means at one end to prevent elevation thereof, whereby to incline said runway at an angle to the horizontal, and means to indicate the amount of inclination.

11. In a testing apparatus, a runway, carriages on said runway, revolvable means for supporting said carriages, means for securing any one or more of said carriages against movement relative to said runway, means to incline said runway at an angle to the horizontal, and means to indicate the amount of inclination.

12. A method of testing the stopping power of one wheel of an automobile of known weight, which consists in mounting the automobile on an inclinable runway, applying the brakes, removing the frictional resistance of three of the wheels, inclining the runway until movement of the automobile occurs, measuring the angle of inclination of the automobile and calculating the stopping power of the wheel to be tested therefrom.

In testimony whereof I affix my signature.

DAVID C. SCOTT.